United States Patent [19]

Sasaki

[11] Patent Number: 4,965,852

[45] Date of Patent: Oct. 23, 1990

[54] RADIO TRANSMITTER-RECEIVER SYSTEM FOR INCREASING OR DECREASING COMMUNICATION CHANNELS

[75] Inventor: Susumu Sasaki, Fujisawa, Japan

[73] Assignee: Fujitsu Limited, Kawasaki, Japan

[21] Appl. No.: 125,233

[22] Filed: Nov. 25, 1987

[30] Foreign Application Priority Data

Dec. 3, 1986 [JP] Japan ................................ 61-288532

[51] Int. Cl.⁵ .......................... H04B 1/40; H04B 1/74
[52] U.S. Cl. ........................................ 455/82; 455/8;
    455/78; 370/38; 370/69.1; 370/16
[58] Field of Search ................... 455/8, 101, 120, 103,
    455/49, 52, 63, 78, 82; 370/13, 16, 38, 69.1, 120

[56] References Cited

U.S. PATENT DOCUMENTS

| | | | |
|---|---|---|---|
| 3,089,920 | 5/1963 | Law | 370/120 |
| 3,549,811 | 12/1970 | Berreson | 370/76 |
| 4,039,947 | 8/1977 | Miedema | 455/8 |
| 4,155,039 | 5/1979 | Lechevin | 370/69.1 |
| 4,287,598 | 9/1981 | Langseth et al. | 455/52 |
| 4,417,348 | 11/1983 | Abbruscato | 455/8 X |
| 4,541,121 | 9/1985 | Blum | 455/103 |

FOREIGN PATENT DOCUMENTS

2738624 3/1978 Fed. Rep. of Germany .

OTHER PUBLICATIONS

H. Panschar, "Versatile Modular System for Automatic Protection Switching on Radio Relay Links", Siemens Review, vol. 45, No. 10, Oct. 1978, Munich, DE.

European Search Report for EP-87-11-7896, The Hague, Mar. 5, 1989.
R. E. Fisher, "A Subscriber Set for the Equipment Test", The Bell System Technical Journal, vol. 58, No. 1, Jan. 1979, pp. 123, 128-131.
N. Ehrlich et al., "Cell-Site Hardware", The Bell System Technical Journal, vol. 58, No. 1, Jan. 1979, pp. 153, 176, 177, and page beginning section 4.7 and page illustrating FIG. 19.
S. Sasaki et al., "17 Mbits/sec 2 GHz Digital Radio System", Fujitsu Scientific & Technical Journal, Sep. 1980, pp. 1-7.

*Primary Examiner*—Douglas W. Olms
*Assistant Examiner*—Ralph Smith
*Attorney, Agent, or Firm*—Staas & Halsey

[57] ABSTRACT

The radio transmitter-receiver system for increasing or decreasing communication channels comprises radio transmitter-receivers each including a separated intermediate frequency portion for modulation and demodulation and a separated microwave portion, and having a multiplexer and a divider therebetween. Local oscillators in the intermediate frequency portion have a variable frequency function and the operating frequency of the intermediate frequency portion can be easily changed. The intermediate frequency portions are connected to the microwave portions through the multiplexer or the divider and the frequency of the microwave to be communicated is easily changed. Thus, an increase or decrease of the communication channels is possible at a low cost.

10 Claims, 4 Drawing Sheets

RADIO TRANSMITTER-RECEIVER SYSTEM FOR INCREASING OR DECREASING COMMUNICATION CHANNELS

BACKGROUND OF THE INVENTION

1. Field of the Invention

The present invention relates to a radio transmitter-receiver system for increasing or decreasing communication channels, more particularly to a radio transmitter-receiver system for increasing or decreasing communication channels by varying a frequency of an intermediate frequency (IF) local oscillator in a heterodyne type radio transmitter-receiver instead of using a duplexer for a radio frequency (RF) signal.

2. Description of the Related Art

In a communication system wherein the communication network is constituted by lines provided among many node stations, and back-up lines are provided between each station, for example, when lines are provided between stations A, B, C, and D, if there is a breakdown in the line between stations A and D, communication between the stations A and D is established through a line between stations A and C and a line between stations C and D. A different frequency is usually applied to each line, and each line has a transmission capacity of, for example, 1200 channels per one frequency.

In addition, a standby radio transmitter-receiver is usually provided to continue communications in the event of a malfunction of the working radio transmitter-receiver, and thus a station generally comprises both a working and a standby radio transmitter-receiver.

Conventionally, a heterodyne type transmitter-receiver is used. The transmitter receives a baseband input and comprises a low-pass filter, three amplifiers, a modulator, an intermediate frequency oscillator, a radio frequency oscillator, two mixers, and two band-pass filters. An RF (radio frequency) output is output from one of the amplifiers. The receiver receives an RF input and comprises a radio frequency oscillator, an intermediate frequency oscillator, two mixers, two band-pass filters, three amplifiers, a demodulator, and a low-pass filter. A baseband output is output from one of the amplifiers.

In such a communication network, if a line failure occurs, such as a deterioration in transmission characteristics caused by heavy rain, an obstruction by microwave shielding matter, damage to an antenna, or the like, communication by even a normal radio transmitter-receiver becomes difficult or impossible. If the channel capacity of the back-up line is provided with a sufficient margin, the failed line can be by-passed and eventually replaced. However, if the margin is insufficient, a back-up can be provided for only a short time, but the replacement of the failed line may take a long time, and thus there is a drop in capacity during the intervening period.

The present invention intends to solve these problems by changing the constitution of the radio transmitter-receiver, and thus making it possible to increase or decrease the number of channels in the line.

SUMMARY OF THE INVENTION

An object of the present invention is to provide a radio transmitter-receiver system for increasing or decreasing communication channels, wherein the communication channels are increased or decreased at a low cost by changing the constitution of the conventional radio transmitter-receiver, thus avoiding the necessity for providing a plurality of high cost branching circuits.

Another object of the present invention is to provide a radio transmitter-receiver system for increasing or decreasing communication channels wherein, by providing a multiplexer and a divider at an entrance and an exit of the radio frequency portions, respectively, instead of using branching circuits, an increase of a loss of transmission power and a deterioration of the noise figure upon reception are prevented, and a reduction of space occupied becomes possible because the number of branching circuits used is reduced.

A further object of the present invention is to provide a radio transmitter-receiver system for increasing or decreasing communication channels, wherein the frequency applied at the lines can be changed comparatively easily by changing a quartz oscillator or changing the parts rating in a synthesizer-type radio transmitter-receiver.

Therefore, according to the present invention, there is provided a radio transmitter-receiver system for increasing or decreasing communication channels comprising a plurality of antennas, a plurality of transmitter-receivers, a plurality of IF (intermediate frequency) multiplexers, a plurality of IF dividers, and a plurality of communication lines between the antennas. The antennas receive input RF signals and transmit output RF signals. Each of the plurality of transmitter-receivers has an RF portion and an IF portion. The RF portion receives an RF signal from the antenna and supplies an RF output to the antenna. An intermediate frequency from the IF portions and a radio frequency from the antennas at the RF portions are converted to a radio frequency to the antennas and to an intermediate frequency to the IF portions, respectively. A baseband input and an intermediate frequency from the RF portions at the IF portions are converted to an intermediate frequency to the RF portions and to a baseband output, respectively. The IF portion is provided with local oscillators generating a variable frequency.

An IF multiplexer and an IF divider are located between the RF portion and the IF portion. The IF multiplexer receives outputs from a plurality of IF portions and supplies an output to the RF portion. The IF divider receives an output from the RF portion and supplies outputs to a plurality of IF portions. Each communication line between the antennas is allotted a different frequency, to form a communication network.

Other features and advantages of the invention will be apparent from the following description made with reference to the accompanying drawings.

DESCRIPTION OF THE PREFERRED EMBODIMENTS

Prior to the description of a preferred embodiment of the present invention, the related arts are explained with reference to the relevant drawings.

Figure 1:
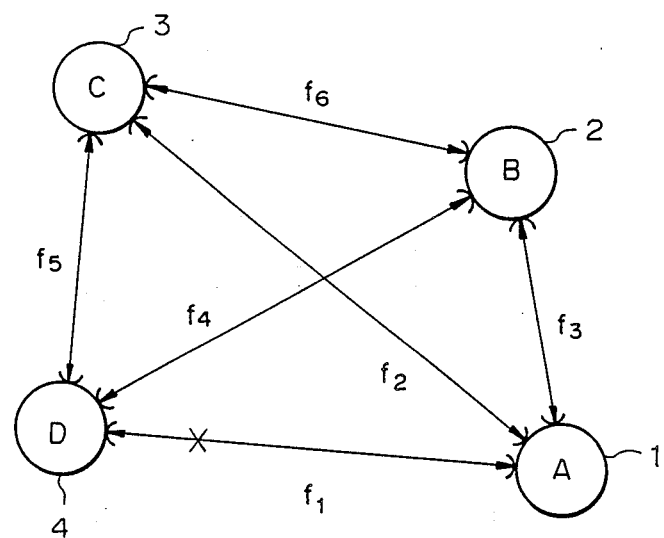
FIG. 1 is a schematic diagram explaining a radio transmitter-receiver system to which the present invention is applied.
Figure 2:
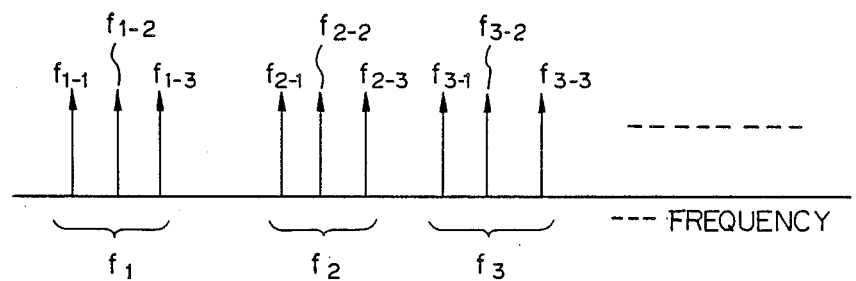
FIG. 2 is a diagram explaining frequencies used in the system of FIG. 1.

As shown in FIG. 1, a radio transmitter-receiver system comprises, for example, node stations A, B, C, and D, and communication lines provided therebetween. Note, sometimes the lines are provided with a frequency division system and are allotted different frequencies. In FIG. 1, the line between the node stations A and D is allotted frequency band $f_1$, the line between the node stations A and C is allotted frequency band $f_2$, the line between the node stations A and B is allotted frequency band $f_3$, and so on. The transmission capacity for one frequency is, for example, 1200 channels. Further, sometimes each frequency band comprises three frequencies, $f_{1-1}$ to $f_{1-3}$, $f_{2-1}$ to $f_{2-3}$, or the like, and thus the capacity for one frequency band becomes $1200 \times 3$ channels.

A standby apparatus is provided to ensure a continued communication in the event of a breakdown of the working radio transmitter-receiver, and therefore, each station comprises at least two radio transmitter-receivers. In the system shown in FIG. 3, the pairs of reference numerals 11 and 11A, 12 and 12A, and 13 and 13A each represent one radio transmitter-receiver apparatus, respectively. The radio transmitter-receiver 11 and 11A is allotted the frequency $f_{1-1}$, the radio transmitter-receiver 12 and 12A is allotted the frequency $f_{1-2}$, and the radio transmitter-receiver 13 and 13A is allotted the frequency $f_{1-3}$. Accordingly, the node station A is provided with three radio transmitter-receivers for each of the frequency band $f_1$, the frequency band $f_2$, and the frequency band $f_3$. The above arrangement is also provided in the node stations B, C, or the like.

Figure 3:
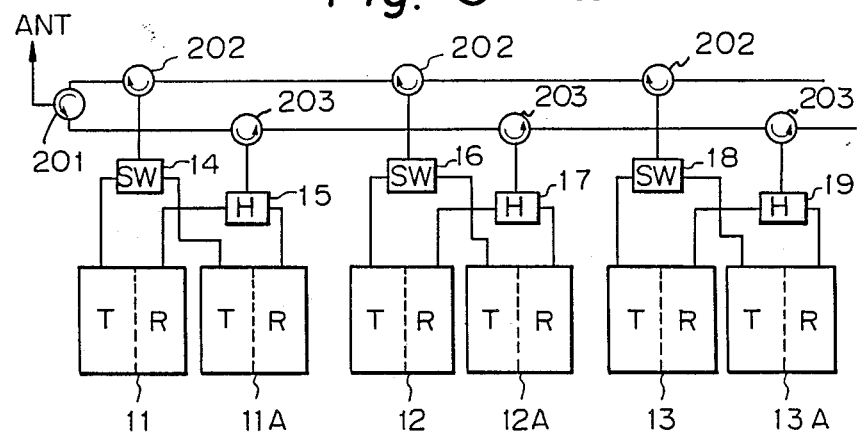
FIG. 3 is a block diagram showing the constitution of conventional radio transmitter-receivers in a node station used in the system of FIG. 1.

In FIG. 3, both transmission and received signals pass through a duplexer 201 connected to an antenna (ANT). The received signals are branched by branching circuits 203 to pairs of working and standby transmitter-receivers (11, 11A; 12, 12A; 13, 13A) through RF dividers (H) 15, 17, 19, respectively. The transmission signals from the transmitter-receivers 11 and 11A, 12 and 12A, and 13 and 13A are selected by RF switches (SW) 14, 16, 18, respectively. The selected signals from the transmitter-receivers 11, 11A; 12, 12A; and 13, 13A are multiplexed by branching circuits 202 and transmitted to the antenna through the duplexer 201.

Figure 4:
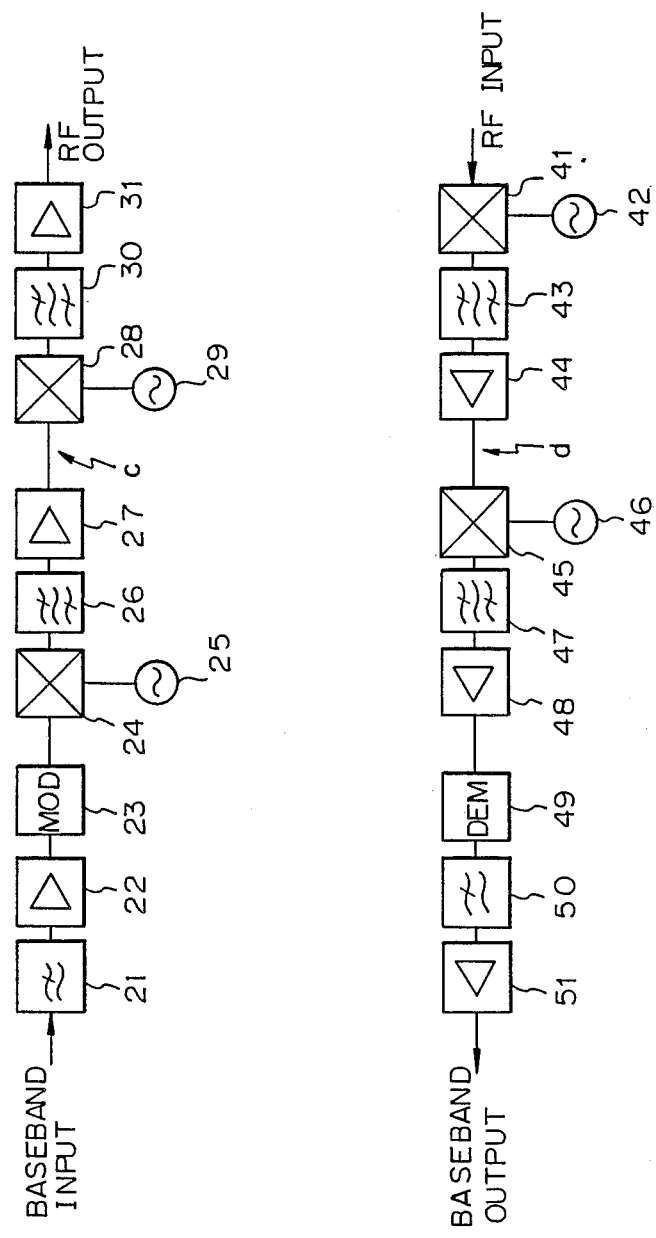
FIG. 4 is another block diagram showing the constitution of a conventional radio transmitter-receiver, wherein an upper part is a transmitter portion and a lower part is a receiver portion.

As shown in FIG. 4, these radio transmitter-receivers are heterodyne type apparatuses. In FIG. 4, an upper part shows a transmitter portion which receives a baseband input. The baseband input passes through a low-pass filter 21, an amplifier 22, a modulator (MOD) 23, a mixer 24, which mixes an output from an intermediate frequency oscillator 25 and the output of the modulator 23, a band-pass filter 26, an amplifier 27, a mixer 28, which mixes an output from a radio frequency oscillator 29 and the output of the amplifier 27, a band-pass filter 30, and an amplifier 31. The RF output is output from the amplifier 31. Also in FIG. 4, a lower part shows a receiver which receives an RF input. The RF input passes through a mixer 41, which mixes the RF input and an output of an RF oscillator 42, a band-pass filter 43, an amplifier 44, a mixer 45, which mixes an output of an intermediate frequency oscillator 46 and the output of the amplifier 44, a band-pass filter 47, an amplifier 48, a demodulator (DEM) 49, a low-pass filter 50, and an amplifier 51. The baseband output is output from the amplifier 51.

Figure 5:
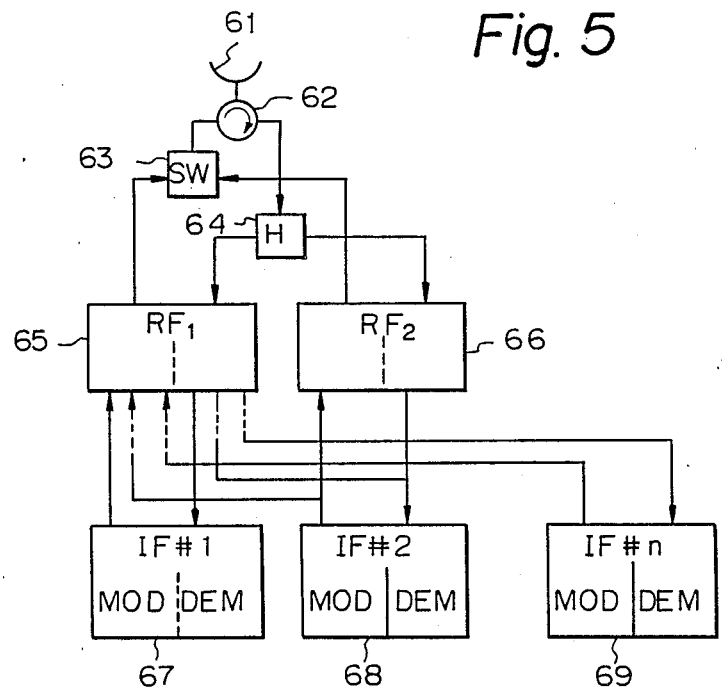
FIG. 5 is a partial block diagram showing radio transmitter-receivers in a node station in a radio transmitter-receiver system according to an embodiment of the present invention.

The constitution of a group of radio transmitter-receivers in a radio transmitter-receiver system for increasing or decreasing communication channels according to an embodiment of the present invention is shown in FIG. 5.

In this group of radio transmitter-receivers, only one frequency band is applied; the node station comprises a plurality of groups of radio transmitter-receivers; and the radio transmitter-receiver system comprises a plurality of the node stations and communication lines provided therebetween.

Each group comprises an antenna 61, a duplexer 62, an RF switch 63, an RF divider 64, two radio transmitter-receivers 65, 61 and 66, 68, and an IF portion (#n) 69 of another transmitter-receiver. The two radio transmitter-receivers are a working apparatus (#1) and a standby apparatus (#2). Each transmitter-receiver comprises an RF portion and an IF portion, and further, is divided into a transmitter portion and a receiver portion.

The antenna 61 is connected to the duplexer 62, for example, a circulator, and the duplexer 62 is connected to the RF switch (SW) 63 and the RF divider (H) 64. An RF portion ($RF_1$) 65 of the working transmitter-receiver supplies an output to the switch 63 and receives a signal from the divider 64. The RF portion ($RF_2$) 66 of the standby transmitter-receiver supplies an output to the switch 63 and receives a signal from the divider 64.

Figure 6:
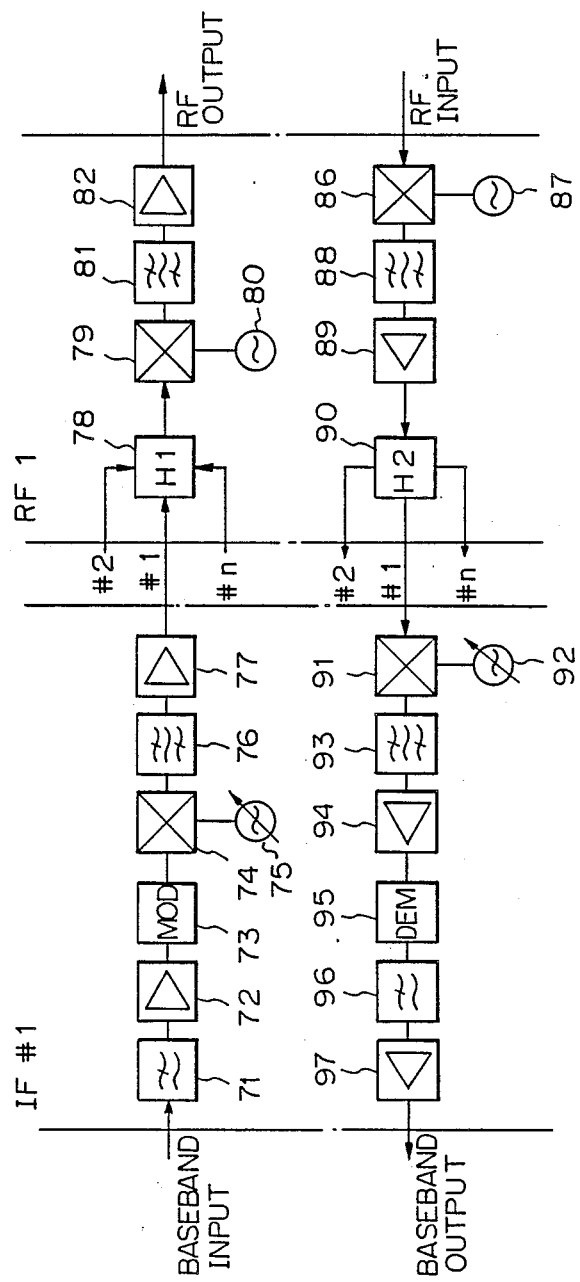
FIG. 6 is a block diagram showing a constitution of the radio transmitter-receiver of FIG. 5.

The transmitter portion and the receiver portion are shown at the upper and lower parts of FIG. 6, respectively. The transmitter portion comprises a low-pass filter 71, an amplifier 72, a modulator (MOD) 73, an IF mixer 74, which mixes the outputs of the modulator 73 and an IF variable frequency oscillator 75, a band-pass filter 76, an amplifier 77, an IF multiplexer ($H_1$) 78, an RF mixer 79, which mixes the output of the multiplexer 78 and an output of an RF local oscillator 80, a band-pass filter 81, and an amplifier 82. A baseband input is applied to the low-pass filter 71 and passes through the above-mentioned elements in the above sequence, and an RF output is output from the amplifier 82.

The receiver portion comprises an RF mixer 86, which mixes the RF input and an output from an RF local oscillator 87, a band-pass filter 88, an amplifier 89, an IF divider ($H_2$) 90, an IF mixer 91, which mixes the output of the divider 90 and an output from an IF variable frequency oscillator 92, a band-pass filter 93, an amplifier 94, a demodulator (DEM) 95, a low-pass filter 96, and an amplifier 97. The RF input is applied to the mixer 86 and passes through the above-mentioned elements in the above sequence, and a baseband output is output from the amplifier 97.

In this embodiment, as shown in FIG. 6, the multiplexer ($H_1$) 78 and the divider ($H_2$) 90 are inserted at point c and point d of FIG. 4, respectively, and the intermediate frequency oscillators 25 and 46 of FIG. 4 are replaced by the IF variable frequency oscillators 75 and 92, respectively. In FIG. 5, the $RF_1$ (65) and IF #1 (67) correspond to the transmitter-receiver 11, and the RF₂ (66) and IF #2 (68) correspond to the transmitter-receiver 11A, of FIG. 3.

The transmitter-receivers 12, 12A and 13, 13A, can be replaced with corresponding groups as shown in FIG. 5. In a node station according to this embodiment, the above-mentioned transmitter-receivers are provided for each of the frequencies $f_1$, $f_2$, $f_3$, and the like. Each RF portion can be connected to three IF portions (#1, #2, #n), as shown in FIG. 6, since the operating frequency at the RF portion (GHz) is much higher than that of the IF portion (MHz) and a bandwidth of the RF portion is wider than that of the IF portion. Therefore, the RF portion has a plurality of channels, and thus more than three IF portions can be connected to one RF portion. Note, IF #n may be included in any group.

In FIG. 6, the multiplexer 78 is supplied with outputs from the IF portions #1, #2, and #n, and the divider 90 supplies an output to the IF portions #1, #2, and #n.

Two RF portions are provided in FIG. 5, and as usual, the RF₁ (65) is connected to the IF #1 (67) and the RF₂ (66) is connected to the IF #2 (68). There is no RF portion corresponding to the IF #n (69). The band limitation of each channel is usually carried out in the IF band or the baseband.

As the above-mentioned radio transmitter-receivers are provided in each node station, if a communication line failure occurs, the following countermeasures can be taken. For example, if there is a failure of the communication line between stations A and D, the transmission frequency band $f_1$ in the A station ($f_{1-1}$ to $f_{1-3}$ hereinafter) is changed to the frequency bands $f_2$ and $f_3$. This change is made by changing the frequency of the IF variable frequency oscillator in the IF portion. The frequency-changed signal is then applied to the communication lines between the stations A and C and between the stations A and B, by connecting the IF #n (69) to the RF₁ (65). In the above description, the IF #n (69) is a working IF portion in a group using the frequency band $f_1$ before the failure, and the RF₁ (65) belongs to a group using the frequency band $f_2$ or $f_3$. The IF #n (69) may be connected to the RF₂ (66). In this example, the IF #1 (67) is the working apparatus and the IF #2 (68) is the standby apparatus, i.e., the RF₁ (65) is in an operational state and the RF₂ (66) is in a non-operational state, and thus the IF #n (69) is connected to the RF₁ (65). The IF #n (69) is utilized only for the operational apparatus, and not used for the standby apparatus. At station D, the frequency band $f_1$ of the radio transmitter-receivers is changed to the frequencies $f_4$ and $f_5$, and the frequency-changed signals are then applied to the communication lines between the stations D and B and between the stations D and C. At the stations B and C, the standby IF portions are brought to the operational state to deal with the increased amount of communication data from the stations A and D. As a result, if there is a failure in the communication line between stations A and D, communication between the stations A and D can be continued over a long period via the routes A→C→D and A→B→D.

In another example, the frequency band $f_1$ on a failed line may be used on a by-passed line. In this example, if the frequencies of the RF local oscillators in each group are the same, the IF local oscillator of the IF #n does not need to change the frequency in the stations A and D, but this frequency change is necessary in the stations B and C. If, in each group, the frequency of the RF local oscillator is different, the frequency of the IF local oscillator of the IF #n must be changed to obtain the frequency band $f_1$, even in the stations A and D.

In this system, the frequency band $f_1$ of the standby radio transmitter-receiver at a station is changed to the frequency band $f_2$ for operational use, and thus any sudden failure in communications can be overcome.

In the prior art shown in FIG. 3, a system can be realized wherein the number of transmitter-receivers is increased to increase the number of communication channels, and circulators are provided in an antenna circuit, but in this system a large number of high cost circulators must be provided, and an extra transmitter-receiver including an IF portion and RF portion becomes necessary.

What is claimed is:

1. A radio transmitter-receiver apparatus for increasing or decreasing communication channels between node stations of a communication network, said apparatus comprising:

a plurality of antenna means for receiving input RF signals and for transmitting output RF signals;

a plurality of transmitter-receiver means including RF portions and IF portions, said RF portions receiving the input RF signals from one of said antenna means and supplying the output RF signals to one of said antenna means, intermediate frequency output signals from said IF portions supplied to said RF portions and converted to the output RF signals, the input RF signals converted to intermediate frequency input signals and supplied to said IF portions, baseband input signals converted to the intermediate frequency output signals and supplied to said RF portions, the intermediate frequency input signal from said RF portions converted at said IF portions to baseband output signals, each of said IF portions being provided with a local oscillator generating a variable frequency;

IF multiplexer means, provided between said RF portions and said IF portions of said plurality of transmitter-receiver means, for receiving the intermediate frequency output signals from a plurality of said IF portions and supply multiplexed signals to said RF portions;

IF divider means for receiving the intermediate frequency input signals from said RF portions and supplying division signals to the plurality of said IF portions; and a plurality of communication lines, each having a different frequency, provided between said plurality of antenna means forming the communication network.

2. The apparatus as set forth in claim 1, wherein when a communication line failure occurs, at least one of said IF portions affected by the communication line failure changes the variable frequency of the local oscillator provided therein, the intermediate frequency output signal of the at least one of said IF portions is supplied of said IF multiplexer means belonging to another communication line, the intermediate frequency input signal is supplied to said IF divider means belonging to the another communication line, and the communication line failing is by-passed.

3. The apparatus as set forth in claim 1, wherein at least one transmitter-receiver means is a standby apparatus.

4. The apparatus as set forth in claim 1, wherein said transmitter-receiver means includes a transmitter section and a receiver section, wherein said RF portions and said IF portions are provided within the transmitter section and the receiver section, and said IF multiplexer means comprises an IF multiplexer provided in the transmitter section between each of said RF portions and said IF portions, and said IF divider means comprises an IF divider provided in the receiver section between each of said RF portions and said IF portions, wherein each of said RF portions within the transmitter section comprises:
a first RF oscillator, and
first RF mixer means for mixing outputs of said IF multiplexer and said first RF oscillator, wherein said IF portions within the transmitter section comprises:
a first variable oscillator as the local oscillator,
modulator means for receiving a baseband input signal, and
first IF mixer means for mixing outputs of the modulator means and the first variable oscillator, wherein said RF portions within the receiver section comprises:
a second RF oscillator, and
second RF mixer means for mixing the RF input and an output of said second RF oscillator, and wherein said IF portions within the receiver section comprises:
a second variable oscillator as the local oscillator,
second IF mixer means for mixing a divisional signal from said IF divider and an output of the second variable oscillator, and
demodulator means for receiving an output of the second IF mixer means and for outputting the baseband output signal.

5. The apparatus as set forth in claim 1, wherein when a communication line failure occurs, the intermediate frequency output signal of an associated IF portion is connected to said IF multiplexer means and said IF divider means belonging to another communication line, and a filed communication line is by-passed using the same frequency as the failed communication line.

6. The apparatus as set forth in claim 2, wherein at least one transmitter-receiver means is a standby apparatus.

7. A radio transmitter-receiver apparatus for increasing or decreasing communication channels comprising:
(a) a plurality of transmitter-receiver stations; and
(b) a plurality of communication lines, each having a different frequency band, provided between said transmitter-receiver stations,
each of said transmitter-receiver stations including
(i) antenna means for receiving input radio frequency signals and transmitting output radio frequency signals, and
(ii) a plurality of transmitter-receivers, comprising
(1) radio frequency receiving means for receiving received radio frequency signals from the antenna means and converting the received radio frequency signals to first intermediate frequency signals,
(2) first intermediate frequency means for receiving the first intermediate frequency signals from aid radio frequency receiving means and providing baseband outputs,
(3) second intermediate frequency means for receiving baseband inputs, converting the baseband inputs to second intermediate frequency signals and outputting the second intermediate frequency signals,
(4) radio frequency transmitting means for receiving the second intermediate frequency signals from the second intermediate frequency means, converting the second intermediate frequency signals to transmission radio frequency signals, and outputting the transmission radio frequency signals to the antenna means,
(5) intermediate frequency multiplexer means, provided between the second intermediate frequency means and the radio frequency transmitting means, for receiving the second intermediate frequency signals from the second intermediate frequency means and supplying the second intermediate frequency signals in a single output to the radio frequency transmitting means, and
(6) intermediate frequency divider means provided between the radio frequency receiving means and the first intermediate frequency means, for receiving the first intermediate frequency signals from the radio frequency receiving means and dividing and outputting the first intermediate frequency signals among the first intermediate frequency means.

8. A radio transmitter receiver apparatus for increasing or decreasing communication channels as set forth in claim 7, wherein each of said first and second intermediate frequency means includes a local variable frequency oscillator, the local variable frequency oscillators change the frequency of the baseband outputs and second intermediate frequency signals of the first and the second intermediate frequency means, respectively, when one of said communication lines fails, for bypassing the one of said communication lines.

9. The apparatus as set forth in claim 7, wherein at least one of said transmitter-receivers in each of said transmitter-receiver stations is a standby transmitter-receiver.

10. The apparatus as set forth in claim 7, wherein when one of said communication lines fails, the failed communication line is bypassed using a frequency band of the failed communication line by connecting the first and second intermediate frequency means of an associated receiver-transmitter to the intermediate frequency multiplexer means and the intermediate frequency divider means of a different one of said receiver-transmitters associated with an operational communication line.

* * * * *

UNITED STATES PATENT AND TRADEMARK OFFICE
CERTIFICATE OF CORRECTION

PATENT NO. : 4,965,852
DATED : October 23, 1990
INVENTOR(S) : Sasaki

It is certified that error appears in the above-identified patent and that said Letters Patent is hereby corrected as shown below:

Col. 4, line 22, change "61" to --67--;
       line 34, change "The" to --An--.

Col. 5, line 50, change "frequencies" to --frequency bands--.

Col. 6, line 44, change "supply" to --supplying--;
       line 58, change "therein ," to --therein,--;

Col. 8, line 5, change "aid" to --said--.

Signed and Sealed this

Seventeenth Day of March, 1992

Attest:

HARRY F. MANBECK, JR.

*Attesting Officer*      *Commissioner of Patents and Trademarks*